(12) United States Patent
Das (10) Patent No.: US 11,157,802 B2
(45) Date of Patent: Oct. 26, 2021

(54) NEURAL CHIP AND A METHOD OF OPTIMIZING OPERATION OF THE NEURAL CHIP

(71) Applicant: WIPRO LIMITED, Bangalore (IN)

(72) Inventor: Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 1066 days.

(21) Appl. No.: 15/653,878

(22) Filed: Jul. 19, 2017

(65) Prior Publication Data
US 2018/0349760 A1 Dec. 6, 2018

(30) Foreign Application Priority Data
Jun. 2, 2017 (IN) .............................. 201741019440

(51) Int. Cl.
*G06N 3/063* (2006.01)
*G06N 3/08* (2006.01)

(52) U.S. Cl.
CPC ............... *G06N 3/063* (2013.01); *G06N 3/08* (2013.01)

(58) Field of Classification Search
None
See application file for complete search history.

(56) References Cited

U.S. PATENT DOCUMENTS

| 5,335,186 A | 8/1994 | Tarrant |
| 2015/0154469 A1* | 6/2015 | Park ................... G06K 9/00986 706/18 |

OTHER PUBLICATIONS

Mohemmed et al, "Training spiking neural networks to associate spatio-temporal input-output spike patterns", 2012, Elsevier, all pages (Year: 2012).*
Indiveri, "Memory and Information Processing in Neuromorphic Systems", 2015, IEEE, all pages (Year: 2015).*
Hsu, J., "IBM's new brain [News]", abstract http://ieeexplore.ieee.org/document/6905473, Sep. 22, 2014, *IEEE*, 2 pages.
McShane, S., "This Amazing Computer Chip is Made of Live Brain Cells", absract https://singularity/hub.com/2016/03/17/this-amazing-computer-chip-is-made-of-live-brain- . . . , 2017, *Singularity Education Group*, 4 pages.

* cited by examiner

*Primary Examiner* — Daniel C Puentes
(74) *Attorney, Agent, or Firm* — Finnegan, Henderson, Farabow, Garrett & Dunner, LLP (57) ABSTRACT

The method of present disclosure relates to neural chip and optimizing operation of a neural chip. The method includes sensing current values of physical parameters indicating an environment. Sensed current values are stored in a memory unit. The memory unit also stores previously sensed values of physical parameters. The current values and the previously sensed values are compared by the neural chip. Based on the comparison, one or more actions are applied using the previously sensed values, for completing the task, if the current values and the previously sensed values are matched. In case there is no matching, the neural chip uses the current valises for applying the one or more actions. The neural chip learns from applying of the actions and updates itself accordingly.

25 Claims, 3 Drawing Sheets

NEURAL CHIP AND A METHOD OF OPTIMIZING OPERATION OF THE NEURAL CHIP

TECHNICAL FIELD

The present subject matter is related, in general to a neural chip and more particularly, to a method of optimizing operation of the neural chip.

BACKGROUND

In recent years, neural chips and implementation of the neural chips have become popular in different technological areas. The neural chips are composed of various sensors having an ability to sense various environmental parameters. These sensors can mimic a human brain, and therefore, the neural chips are also called as artificial human brain inspired neural chips. Also, these neural chips provide assistance to human experts or professionals for performing operations or tasks related to various applications including medical research, space research and the like.

These neural chips are generally designed for specific applications. The neural chips have predefined functionalities based on nature of an application. Though, these neural chips efficiently reduce human efforts and overcomes manual error, however, features including debugging and troubleshooting with problems in real time is a challenge in this area. An ability of verifying or analyzing test results without any external assistance is another challenge faced by the neural chips.

SUMMARY

Disclosed herein is a method of optimizing operation of a neural chip capable of performing human-like operations. The method includes sensing one or more current values of one or more physical parameters indicating an environment associated with an application. The method further includes transmitting, into a memory unit of the neural chip, the one or more current values such that the one or more current values are stored in a short-term memory section of the memory unit. The memory unit further includes a long-term memory section storing pre-trained data and neural model comprising previously sensed values of the one or more physical parameters. The method further includes comparing the one or more current values with the previously sensed values of the pre-trained data and neural model. Further, the method includes a step of performing, based on the comparison, applying of one or more actions using the previously sensed values for completing a task associated with the application when the one or more current values are matched with the previously sensed values. The method further includes segmenting the one or more current values into current data blocks when the one or more current values are unmatched with the previously sensed values of the pre-trained data and neural model. The current data blocks indicate currently learned data. Further, the method includes comparing the current data blocks with previous data blocks, indicating previously learned data associated with the previously sensed values of the pre-trained data and neural model, to determine inconsistency. The method further includes applying the one or more actions using the one or more current values for completing the task associated with the application based on the comparison, and thereby exhibiting learning capability.

Further, the present disclosure relates to neural chip for performing human-like operations. The neural chip comprises one or more sensors, a memory unit, and a ciphering unit. The one or more sensors senses one or more current values of one or more physical parameters indicating an environment associated with an application. Further, the memory unit comprising a short-term, memory section for storing the one or more current values and a long-term memory section for storing previously pre-trained data and neural model comprising previously sensed values of the one or more physical parameters. Further, the ciphering unit compares the one or more current values with the previously sensed values of the pre-trained data and neural model. The neural chip performs, based on the comparison, applying of one or more actions using the previously sensed values for completing a task associated with the application when the one or more current values are matched with the previously sensed values. Further, the neural chip segments the one or more current values into current data blocks when the one or more current values are unmatched with the previously sensed values. The current data blocks indicate currently learned data. The neural chip further compares the current data blocks with previous data blocks, indicating previously learned data, associated with the previously sensed values of the pre-trained data and neural model to determine inconsistency. Further, the neural chip applies the one or more actions using the one or more current values for completing the task associated with the application based on the comparison, thereby exhibiting learning capability.

Furthermore, the present disclosure relates to a non-transitory computer readable medium including instructions stored, thereon that when processed by at least one processor cause a neural chip to perform the acts of sensing one or more current values of one or more physical parameters indicating an environment associated with an application. The instructions further cause the at least one processor to transmit the one or more current values, into a memory unit of the neural chip, such that the one or more current values are stored in a short-term memory section of the memory unit. The memory unit further comprises a long-term memory section storing pre-trained data and neural model comprising previously sensed values of the one or more physical parameters. Further, the instructions further cause the at least one processor to compare the one or more current values with the previously sensed values of the pre-trained data and neural model. The at least one processor performs, based on the comparison, applying of one or more actions using the previously sensed, values for completing a task associated with the application when the one or more current values are matched with the previously sensed values. Further, the at least one processor segments the one or more current values into current data blocks when the one or more current values axe unmatched with the previously sensed values. The current data blocks indicate currently learned data. The at least one processor further compares she current data blocks with previous data blocks, indicating previously learned data, associated with the previously sensed values of the pre-trained data and neural model to determine inconsistency. Further, at least one processor applies the one or more actions using the one or more current values for completing the task associated with the application based on the comparison, thereby exhibiting learning capability.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, winch are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a neural chip and a method of optimizing operation of the neural chip. The neural chips work similar to a human brain. The neural chips analyze data, gradually learns from the analysis and finally act in a matured manner over time. Nowadays, the neural chips are used in various applications including medical research, space research, information technology (IT) solutions, automobile industry and the like. One of the advantages of using the neural chips is that it minimizes human error and human effort to a large extent.

The neural chip disclosed in the present disclosure is interfaced with various sensors capable of sensing various physical parameters. These physical parameters may be related to the environment of any particular application in winch the neural chip is implemented. For example, if the neural chip is implemented within a medical device which may be used for surgery, the physical parameters would be images of organs, movement or activity of the organs and the like. These physical parameters are sensed in real-time and data corresponding to sensed parameters are analyzed by the neural chip.

This analysis may help the medical devices, having the neural chip embedded therein, to take certain actions required while operating the organs or treating different diseases. However, before taking any action, the neural chip may analyze currently sensed data in relative to previously captured or previously trained data. This helps the neural chip in understanding behavior or status of the organs in greater detail. It may happen that current data indicating a symptom for a particular disease may not match with the previously trained data, however the disease diagnosed is same. This variation helps the neural chip to learn about more possibilities which may cause the same disease, but with different symptoms. It should be understood to a person skilled in art, that the implementation of the neural chip is not limited to any particular application, and it may be implemented with other applications too.

Further, the neural chip regularly learns from the current and the past data. The neural chip also updates itself based on actions performed while performing any task. Outcome of the actions or operations performed by the medical devices is continuously monitored by the neural chip. If the actions performed is not as per the standard procedures or it may not be helping the medical device in curing the disease for a long period or predefined attempts, the neural chip may take an immediate action in real time. The neural chip may analyze the reason of such non-performance of the medical devices and may redefine the actions or operations performed by the medical devices. Thus, the ability to troubleshoot the problems and provide suitable solutions in real time makes the neural chip more advanced and efficient.

In the following detailed description of the embodiments of the disclosure, reference is made to the accompanying drawings that form a part hereof, and which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
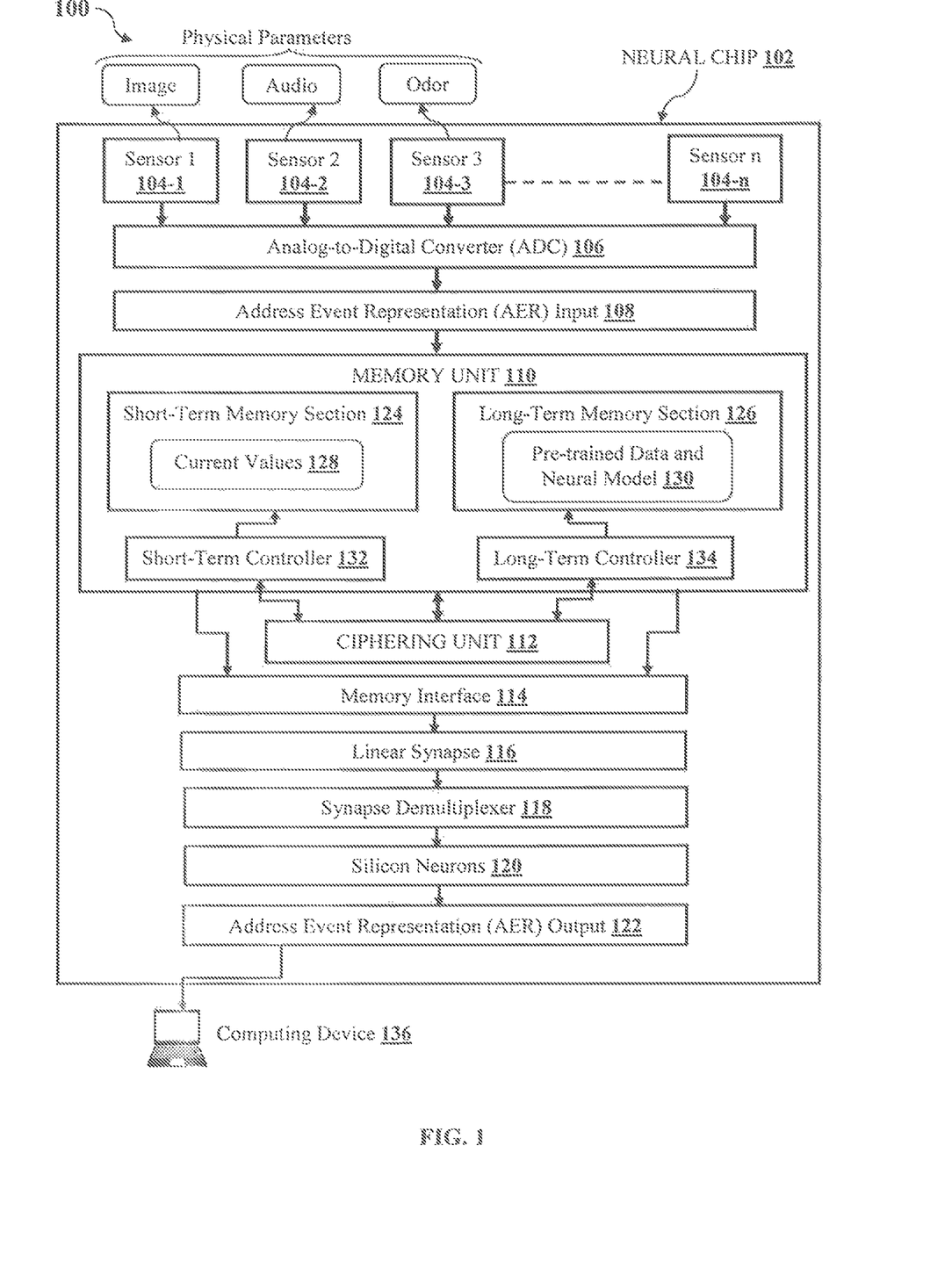
FIG. 1 is an environment and a detailed block diagram illustrating working of a neural chip for performing human-like operations in accordance with some embodiments of the present disclosure.

FIG. 1 is an environment and a detailed block diagram illustrating working of a neural chip for performing human-like operations in accordance with some embodiments of the present disclosure.

The environment 100 includes a neural chip 102 and a computing device 136. The neural chip 102 includes one or more sensors 104, for example sensor 1 104-1 to sensor n 104-n (collectively referred as sensors 104), an analog-todigital convener 106, an address event representation (AER) input 108, a memory unit 110, a ciphering unit 112, a memory interface 114, a linear synapse 116, a synapse demultiplexer 118, silicon neurons 120, and an address event representation (AER) output 122. The sensors 104 may include a silicon retina sensor, a silicon cochlea sensor, a silicon olfactory sensor, an infrared sensor or any other sensor capable of sensing physical parameters. The silicon retina sensor works like a human eye and can absorb light fallen on it and captures the input as an image. The silicon cochlea sensor includes transducers which works like a human ear to sense audio. The audio captured vibrate the transducers and triggers to generate electrical signals. The electrical signals are then amplified and categorized into either high frequency or low frequency or high pitch or low pitch. Further, the silicon olfactory sensor has smell sensing ability to detect presence of chemical molecules, fluids from associated odor. Further, the infrared sensor is capable of detecting motion of an object.

Further, the memory unit 110 includes a short-term memory section 124 and a long-term memory section 126. The short-term memory section 124 is controlled by a short-term controller 132 and the long-term memory section 126 is controlled by a long-term controller 134. The controlling is performed to receive and store data and transmit the data to the ciphering unit 108 and to the memory interface 114. Further, current values 128 (i.e., recent values captured/sensed by the sensors 104) of the sensed physical parameters (i.e., images, audio, odor, and the like) may be stored in the short-term memory section 124 of the memory unit 110. Further, the long-term memory section 126, of the memory unit 110, may store pre-trained data and neural model 130 which includes previously sensed values of the physical parameters.

When the physical parameters are sensed, electrical spikes are generated from the sensors 104 which are passed through an analog-to-digital (ADC) converter 106 of the neural chip 102. The ADC converter 106 converts the electrical signals into digital form and further passes it to the address event representation (AER) input 108. The AER input 108 may transmit the digital form of the current values 128 to the memory unit 110 for further processing. According to an embodiment of present disclosure, two AERs may be coupled with the neural chip 102. The two AERs i.e., the AER input 168 and AER output 122 may work like a handshaking protocol.

The current values 128 and the pre-trained data and neural model 130 stored in the memory unit 110 is processed by the ciphering unit 112, which is explained in upcoming paragraphs of the specification. The output of such processing is sent to the memory interface 114. The memory interface 114 is similar to synapse in a human brain cell. Further, the memory interface 114 forwards the output to the linear synapse 116. The output in the form of electrical spikes is further transmitted, by the linear synapse 116, to the synapse demultiplexer 118. The synapse demultiplexer 118 projects the output to the AER output 122 via the silicon neurons 120. The AER output 122 further projects the output to the computing device 136 for display. Example of the output may include an outcome of one or more actions or operations performed by the neural chip 102.

The neural chip 102 may be implemented with various applications. For example, the neural chip 102 may be implemented in information technology (IT) domain, in which, the neural chip 102 may assist automated tools to perform operations like assigning tickets to employees, assisting in finding required keywords, and the like. Further, in automobile domain, the neural chip 102 may be implemented for detecting any damages in the mechanical components or machineries and taking corrective action accordingly. In another example, the neural chip 102 may be implemented in space research work, in which, it can efficiently overcome the shortcomings like manual error, sustainability of human in the space environment where there is limited food and oxygen. Yet in another example, the neural chip 102 may be implemented with applications related to medical research.

Considering the example of the medical research and diagnosis, the neural chip 102 may actuate and guide medical devices capable of performing surgery or operations. Various tasks may be performed, by the neural chip 102, during the surgery or the operation. If the task is to identify and remove any bacteria or virus from the body, the neural chip 102 may be used along with the medical devices or medical instruments. In the first step, the sensors 104 may sense different parts or organs of the body to capture the images of the organs i.e., physical parameters. The sensing of the images may be performed by the silicon retina sensor interfaced with the neural chip 102.

As discussed above, the sensed values i.e., the current values 128 of the images may be stored in the short-term memory section 124 of the memory unit 110. According to an embodiment, the current values 128 may be transmitted, into the memory unit 110, in two-dimensional form or three-dimensional or four-dimensional form. Apart from the current values 128 i.e., the currently captured images of the organs, the memory unit 110 may also store the previously sensed values (i.e., previously captured images) of the organs. The previously sensed values are stored in the pre-trained data and neural model 130 of the long-term memory section 126. The pre-trained data and neural model 130 helps the neural chip 102 to understand about historical events or incidents captured while identifying the microbial or the pathological presence in the body. According to embodiments of present disclosure, the pre-trained data and neural model 130 has the ability to learn from past and present experience and provide real-time assistance.

Figure 2:
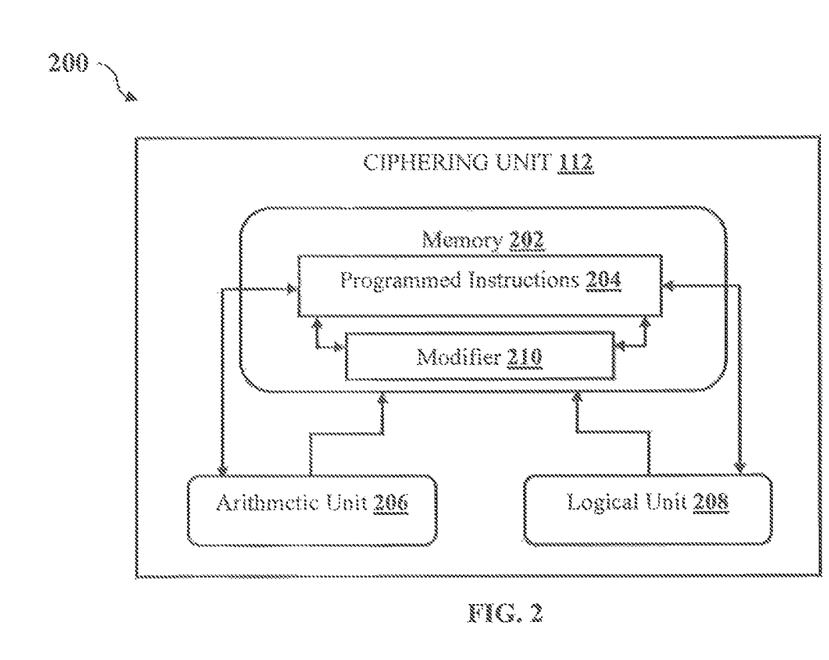
FIG. 2 is a block diagram of ciphering unit in accordance with some embodiments of the present disclosure.

Now, once the current values 128 are sensed and stored, it is further passed to the ciphering unit 112. The ciphering unit 112 provides analytical and cognitive thinking ability to the neural chip 102. FIG. 2 illustrates the ciphering unit 112 in accordance with an embodiment of present disclosure. The ciphering unit 112 consist of hardware components like a memory 202, an arithmetic unit 206, and a logical unit 208 for performing analysis on the current values 128 received from the memory unit 110 of the neural chip 192. The memory 202 of the ciphering unit 112 stores programmed instructions 204 and a modifier 210 for supporting the arithmetic unit 206 and the logical unit 208 for performing various analytical operations of the neural chip 102. According to an embodiment, the programmed instructions 204 provide problem solving logics associated with the different applications in which the neural chip 102 is implemented. For example, if the arithmetic unit 206 and the logical unit 268 observes that current approach for solving any issue is not appropriate, they may give their feedback to the modifier 210. In response, the modifier 210 may redefine the current approach with a new approach or may modify the current approach based on the feedback. The ability of self-healing keeps the neural chip 102 incubating with more real-time scenarios. The analytical operations of the ciphering unit 112 and ability of redefining the approach is explained in subsequent paragraphs of the specification.

Referring back to the medical research application, the ciphering unit 112 may compare the current values 128 with the previously sensed values of the pre-trained data and neural model 130. The comparison is performed to check whether the current values 128 create a same pattern, already present in the pre-trained data and neural model 130, for identifying the presence of any bacteria or virus in the body. If the pattern matches i.e., the current values 128 are matched with the previously sensed values of the pre-trained data and neural model 130 during the comparison, it may be confirmed that the bacteria or the virus is present in the body. Based on the identification, the neural chip 102 may apply one or more actions (i.e., curative actions) using the previously sensed values for completing a task of curing the disease. In other words, the neural chip 102 coupled with the medical device may actuate it to remove the bacteria or the virus from the body.

However, according to another embodiment, it may happen that the current values 128 may not match with the previously sensed values of the pre-trained data and neural model 130 during the comparison. In such a scenario, the neural chip 102 may segment or slice the current values 128 into current data blocks. The current data blocks indicate currently learned data by the neural chip 102. Further, the neural chip 102 may compare the current data blocks with previous data blocks. The previous data blocks, indicates the previously learned data, are the segmented data blocks of the previously sensed values. The block level comparison provides a deeper insight to the neural chip 102 about the validity between the current values 128 and the previously sensed values. If the current data blocks are matched with the previous data blocks, the neural chip 102 may reaffirm the validity of the previous data blocks and apply the one or more actions using the previously sensed values for completing the task.

But, if the current data blocks are not matched with the previous data blocks, the neural chip 102 may apply the one or more actions using the current values 128, instead of using the previously sensed values, for completing the task. Also, the neural chip 102 may replace the previous data blocks with the current data blocks when the current data blocks and the previous data blocks are not matched during the comparison. This way, the pre-trained data and neural model 139 is updated with new data block, or in other words, new values of the physical parameters which may be used for performing the actions for completing the task.

Examples of the one or more actions may include like identifying the affected region in the body where the bacteria/virus is present, inserting a surgical arm to collect or hold the bacteria and safely removing it from the body. Thus, the one or more one or more actions are applied by using either the current values of 128 or the previously sensed values. All these actions are stored in the pre-trained data and neural model 130. Further, the neural chip 102 may also monitor the one or more actions and corresponding outcome. The pre-trained data and neural model 130 keep learning from the one or more actions applied for completing the task and the outcome. Based on the learning, the pre-trained data and neural model 130 update itself accordingly. If the objective associated with the task is met with the one or more actions, the neural chip 102 may refer the one or more actions for future tasks.

However, if the objective is not met, the neural chip 102 may redefine the one or more actions. In other words, the neural chip 102 may apply the arithmetic or logical approach and analyze the reason of not meeting the objectives and modify the current approach in real-time. This troubleshooting feature makes the neural chip more advance and robust. Further, the outcome of the applying of the one or more actions, using least one of the previously sensed values and the one or more current values for completing the task, is displayed on the computing device 136 connected with the neural chip 102.

Figure 3:
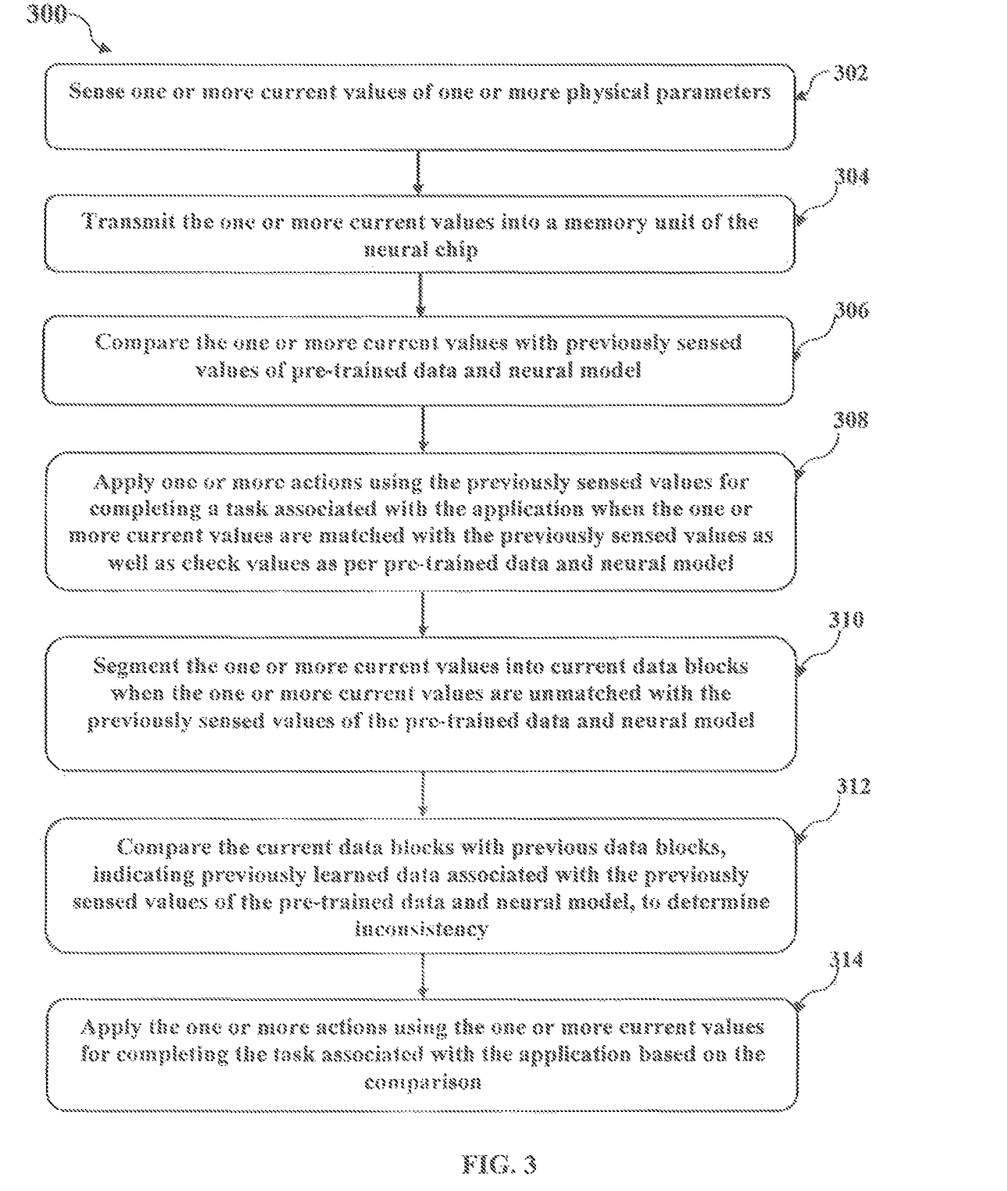
FIG. 3 is a flowchart illustrating a method for optimizing operation of the neural chip capable of performing human-like operations with some embodiments of the present disclosure.

FIG. 3 shows a flowchart illustrating a method for optimizing operation of the neural chip capable of performing human-like operations with some embodiments of the present disclosure.

As illustrated in FIG. 3, the method 300 includes one or more blocks illustrating a method of optimizing operation of the neural chip 102 capable of performing human-like operations. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from, the spirit and scope of the subject matter described herein. Furthermore, the method can be implemented in any suitable hardware, software, firmware, or combination thereof.

At block 302, the method 300 includes sensing, by one or more sensors 104 interfaced with the neural chip 102, one or more current values 128 of one or more physical parameters indicating an environment associated with an application. The one or more physical parameters may include at least one of an image, an audio, an odor, and motion of object. Further, the application may include at least one of a medical research application, a space research application, and an information technology (IT) application. Further, the one or more sensors 104 may include a silicon retina sensor, a silicon cochlea sensor, a silicon olfactory sensor, and an infrared sensor.

At block 304, the method 300 includes transmitting, into a memory unit 110 of the neural chip 102, the one or more current values 128 such that the one or more current values 128 are stored in a short-term memory section 124 of the memory unit 110. The memory unit 110 further comprises a long-term memory section 126 storing the pre-trained data and neural model 130 comprising previously sensed values of the one or more physical parameters.

At block 306, the method 300 includes comparing, by a ciphering unit 112 of the neural chip 102, the one or more current values 128 with the previously sensed values of the pre-trained data and neural model 130.

At block 308, the method 300 includes applying, by the neural chip 102, the one or more actions using the previously sensed values for completing a task associated with the application when the one or more current values 128 are matched with the previously sensed values.

At block 310, the method 360 includes segmenting, by the neural chip 102, the one or more current values into current data blocks when the one or more current values 128 are unmatched with the previously sensed values of the pre-trained data and neural model 130, The current data blocks indicate currently learned data.

At block 312, the method 300 includes comparing, by the neural chip 102, the current data blocks with previous data blocks, indicating previously learned data associated with the previously sensed values of the pre-trained data and neural model 130, to determine inconsistency.

At block 314, the method 300 includes applying, by the neural chip 102, the one or more actions using the one or more current values 128 for completing the task associated with the application based on the comparison, and thereby exhibiting learning capability.

Advantages of the Embodiment of the Present Disclosure are Illustrated Herein

In an embodiment, the present disclosure provides a method for optimizing the operation of the neural chip which overcomes the shortcomings of human like manual error and sustainability of human in various environments.

In an embodiment, the method of the present disclosure provides troubleshooting and debugging capability in real time.

In an embodiment, the method of the present disclosure provides self-learning from the actions performed while completing the tasks.

The terms "an embodiment", "embodiment", "embodiments", "the embodiment", "the embodiments", "one or more embodiments", "some embodiments", and "one embodiment" mean "one or more (but not all) embodiments of the inventions)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected, to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | ENVIRONMENT |
| 102 | NEURAL CHIP |
| 104 | SENSORS |
| 106 | ANALOG-TO-DIGITAL CONVERTER (ADC) |
| 108 | ADDRESS EVENT REPRESENTATION (AER) INPUT |
| 110 | MEMORY UNIT |
| 112 | CIPHERING UNIT |
| 114 | MEMORY INTERFACE |
| 116 | LINEAR SYNAPSE |
| 118 | SYNAPSE DEMULTIPLEXER |
| 120 | SILICON NEURONS |
| 122 | ADDRESS EVENT REPRESENTATION (AER) OUTPUT |
| 124 | SHORT-TERM MEMORY SECTION |
| 126 | LONG-TERM MEMORY SECTION |
| 128 | CURRENT VALUES |
| 130 | PRE-TRAINED DATA AND NEURAL MODEL |
| 132 | SHORT-TERM CONTROLLER |
| 134 | LONG-TERM CONTROLLER |
| 136 | COMPUTING DEVICE |

The invention claimed is:

1. A method of optimizing operation of a neural chip capable of performing human-like operations, the method comprising:

sensing, by one or more sensors interfaced with the neural chip, one or more current values of one or more physical parameters indicating an environment associated with an application;

transmitting, into a memory unit of the neural chip, the one or more current values such that the one or more current values are stored in a short-term memory section of the memory unit, wherein the memory unit further comprises a long-term memory section storing pre-trained data and neural model comprising previously sensed values of the one or more physical parameters;

comparing, by a ciphering unit of the neural chip, the one or more current values with the previously sensed values of the pre-trained data and the neural model; and performing, by the neural chip, one or more actions based on the comparison, wherein the one or more actions comprises:

segmenting the one or more current values into current data blocks when the one or more current values are unmatched with the previously sensed values of the pre-trained data and the neural model, wherein the current data blocks indicate currently learned data, comparing the current data blocks with previous data blocks, wherein the previous data blocks comprising segmented data blocks of the previously sensed values indicate previously learned data, associated with the previously sensed values of the pre-trained data and the neural model to determine inconsistency, wherein comparing the current data blocks with previous data blocks provides insights to the neural chip based on past and present learning of the pre-trained data and the neural model about the validity between the one or more current values and the previously sensed values, and applying the one or more actions using the one or more current values for completing the task associated with the application upon mismatch of the current data blocks with the previous data blocks during comparison, wherein the applying the one or more actions further comprising reaffirming validity of the previous data blocks upon match of the current data blocks and the previous data blocks during the comparison, when the one or more current values are unmatched with the previously sensed values, and applying the one or more actions using the previously sensed values for completing the task, and thereby exhibiting learning capability.

2. The method as claimed in claim 1, wherein the one or more physical parameters comprises at least one of an image, an audio, an odor, and motion of object.

3. The method as claimed in claim 1, wherein the application comprises at least one of a medical research application, a space research application, and an information technology (IT) application.

4. The method as claimed in claim 1, wherein the one or more sensors comprises a silicon retina sensor, a silicon cochlea sensor, a silicon olfactory sensor, and an infrared sensor.

5. The method as claimed in claim 1, wherein, when the one or more current values are unmatched with the previously sensed values of the pre-trained data and the neural model, the applying the one or more actions comprises:
replacing the previous data blocks with the current data blocks when the current data blocks and the previous data blocks are not matched during the comparison.

6. The method as claimed in claim 1, further comprising:
monitoring the one or more actions applied using the at least one of the previously sensed values and the one or more current values;
learning from the one or more actions applied for completing the task based on the monitoring, wherein the learning is used to update the pre-trained data and the neural model; and
performing, based on the learning, at least one of:
continuing with the one or more actions when an objective associated with the task is met, and
redefining the one or more actions when the one or more actions deviates from the objective associated with the task.

7. The method as claimed in claim 1, wherein the one or more current values are transmitted, into the memory unit, in at least one of a two-dimensional form, three-dimensional, and four-dimensional form.

8. The method as claimed in claim 1, further comprising:
applying the one or more actions using the previously sensed values for completing a task associated with the application when the one or more current values are matched with the previously sensed values; and
displaying an outcome associated with the applying of the one or more actions, using least one of the previously sensed values and the one or more current values for completing the task, on a computing device connected with the neural chip.

9. A neural chip for performing human-like operations, the neural chip comprising:
one or more sensors for sensing one or more current values of one or more physical parameters indicating an environment associated with an application;
a memory unit comprising a short-term memory section for storing the one or more current values and a long-term memory section for storing previously pre-trained data and neural model comprising previously sensed values of the one or more physical parameters; and a ciphering unit for comparing the one or more current values with the previously sensed values of the pre-trained data and the neural model,
wherein the neural chip, based on the comparison, performs one or more actions, wherein the one or more actions comprises:
segmenting the one or more current values into current data blocks when the one or more current values are unmatched with the previously sensed values, wherein the current data blocks indicate currently learned data,
comparing the current data blocks with previous data blocks, wherein the previous data blocks comprising segmented data blocks of the previously sensed values indicate previously learned data, associated with the previously sensed values of the pre-trained data and the neural model to determine inconsistency, wherein comparing the current data blocks with the previous data blocks provides insights to the neural chip based on past and present learning of the pre-trained data and the neural model about the validity between the one or more current values and the previously sensed values, and
applying the one or more actions using the one or more current values for completing the task associated with the application upon mismatch of the current data blocks with the previous data blocks during comparison, wherein the applying the one or more actions further comprising reaffirming validity of the previous data blocks upon match of the current data blocks and the previous data blocks during the comparison, when the one or more current values are unmatched with the previously sensed values, and applying the one or more actions using the previously sensed values for completing the task, and thereby exhibiting learning capability.

10. The neural chip as claimed, in claim 9, wherein the one or more physical parameters comprises at least one of an image, an audio, an odor, and motion of object.

11. The neural chip as claimed in claim 9, wherein the application comprises at least one of a medical research application, a space research application, and an information technology (IT) application.

12. The neural chip as claimed in claim 9, wherein the one or more sensors comprises a silicon retina sensor, a silicon cochlea sensor, a silicon olfactory sensor, and an infrared sensor.

13. The neural chip as claimed in claim 9, wherein, when the one or more current values are unmatched with the previously sensed values of the pre-trained data and the neural model, the neural chip applying the one or more actions comprises:
replacing the previous data blocks with the current data blocks when the current data blocks and the previous data blocks are not matched during the comparison.

14. The neural chip as claimed in claim 9, wherein the neural chip further:
monitors the one or more actions applied using the at least one of the previously sensed values and the one or more current values;
learns from the one or more actions applied for completing the task based on the monitoring, wherein the learning is used to update the pre-trained data and the neural model; and
performs, based on the learning, at least one of,
continuing with the one or more actions when an objective associated with the task is met, and redefining the one or more actions when the one or more actions deviates from the objective associated with the task.

15. The neural chip as claimed in claim 9, wherein the one or more current values are transmitted, into the memory unit, in at least one of a two-dimensional form, three-dimensional, and four-dimensional form.

16. The neural chip as claimed in claim 9, wherein the neural chip is connected with a computing device configured to:
apply the one or more actions using the previously sensed values for completing a task associated with the application when the one or more current values are matched with the previously sensed values; and
display an outcome associated with the applying of the one or more actions, using at least one of the previously sensed values and the one or more current values for completing the task associated with the application.

17. The neural chip as claimed in claim 9, further comprising a short-term controller and a long-term controller for controlling the short-term memory section and the long-term memory section respectively.

18. A non-transitory computer-readable storage medium including instructions stored thereon that when processed by at least one processor cause a neural chip to perform operations comprising:
sensing one or more current values of one or more physical parameters indicating an environment associated with an application;
transmitting, into a memory unit of the neural chip, the one or more current values such that the one or more current values are stored in a short-term memory section of the memory unit, wherein the memory unit further comprises a long-term memory section storing pre-trained data and neural model comprising previously sensed values of the one or more physical parameters;
comparing the one or more current values with the previously sensed values of the pre-trained data and the neural model;
performing one or more actions based on the comparison, wherein the one or more actions comprises:
segmenting the one or more current values into current data blocks when the one or more current values are unmatched with the previously sensed values of the pre-trained data and the neural model, wherein the current data blocks indicate currently learned data,
comparing the current data blocks with previous data blocks, wherein the previous data blocks comprising segmented data blocks of the previously sensed values indicate previously learned data, associated with the previously sensed values of the pre-trained data and the neural model to determine inconsistency, wherein comparing the current data blocks with the previous data blocks provides insights to the neural chip based on past and present learning of the pre-trained data and the neural model about the validity between the one or more current values and the previously sensed values, and
applying the one or more actions using the one or more current values for completing the task associated with the application upon mismatch of the current data blocks with the previous data blocks during comparison, wherein the applying the one or more actions further comprising reaffirming validity of the previous data blocks upon match of the current data blocks and the previous data blocks during the comparison, when the one or more current values are unmatched with the previously sensed values, and applying the one or more actions using the previously sensed values for completing the task, and thereby exhibiting learning capability.

19. The medium as claimed in claim 18, wherein the one or more physical parameters comprises at least one of an image, an audio, an odor, and motion of object.

20. The medium as claimed in claim 18, wherein the application comprises at least one of a medical research application, a space research application, and an information technology (IT) application.

21. The medium as claimed in claim 18, wherein the one or more sensors comprises a silicon retina sensor, a silicon cochlea sensor, a silicon olfactory sensor, and an infrared sensor.

22. The medium as claimed in claim 18, wherein, when the one or more current values are unmatched with the previously sensed values of the pre-trained data and the neural model, the applying the one or more actions comprises:
replacing the previous data blocks with the current data blocks when the current data blocks and the previous data blocks are not matched during the comparison.

23. The medium as claimed in claim 18, wherein the instructions further cause the at least one processor to:
monitor the one or more actions applied using the at least one of the previously sensed values and the one or more current values;
learn from the one or more actions applied for completing the task based on the monitoring, wherein the learning is used to update the pre-trained data and the neural model; and
perform, based on the learning, at least one of:
continuing with the one or more actions when an objective associated with the task is met, and
redefining the one or more actions when the one or more actions deviates from the objective associated with the task.

24. The medium as claimed in claim 18, wherein the instructions further cause the at least one processor to connect the neural chip with a computing device configured to:
apply the one or more actions using the previously sensed values for completing a task associated with the application when the one or more current values are matched with the previously sensed values; and
display an outcome associated with the applying of the one or more actions, using at least one of the previously sensed values and the one or more current values for completing the task associated with the application.

25. The medium as claimed in claim 18, wherein the instructions cause a short-term controller and a long-term controller associated with the neural chip for controlling the short-term memory section and the long-term memory section respectively.

* * * * *